US012688031B2

(12) United States Patent
Chen et al.

(10) Patent No.: US 12,688,031 B2

(45) Date of Patent: Jul. 21, 2026

(54) INCREMENTAL CONFIGURATION UPDATES FOR DATA STREAM PROCESSING APPLICATIONS

(71) Applicant: eBay Inc., San Jose, CA (US)

(72) Inventors: Wei Chen, Shanghai (CN); Keshun Deng, Shanghai (CN)

(73) Assignee: eBay Inc., San Jose, CA (US)

( * ) Notice: Subject to any disclaimer, the term of this patent is extended or adjusted under 35 U.S.C. 154(b) by 244 days.

(21) Appl. No.: 18/543,511

(22) Filed: Dec. 18, 2023

(65) Prior Publication Data

US 2025/0199800 A1 Jun. 19, 2025

(51) Int. Cl.
| | |
|---|---|
| *G06F 8/658* | (2018.01) |
| *G06F 9/445* | (2018.01) |
| *G06F 9/451* | (2018.01) |

(52) U.S. Cl.
CPC .......... *G06F 8/658* (2018.02); *G06F 9/44505* (2013.01); *G06F 9/44521* (2013.01); *G06F 9/451* (2018.02)

(58) Field of Classification Search
CPC ........ G06F 8/658; G06F 9/451; G06F 9/4405; G06F 9/44521
USPC ................................................ 717/168–174
See application file for complete search history.

(56) References Cited

U.S. PATENT DOCUMENTS

| | | | | | |
|---|---|---|---|---|---|
| 6,167,407 | A | * | 12/2000 | Nachenberg | ............ G06F 8/658 |
| | | | | | 707/999.203 |
| 6,490,722 | B1 | * | 12/2002 | Barton | ................. H04N 9/8042 |
| | | | | | 348/E5.103 |

| | | | | | |
|---|---|---|---|---|---|
| 7,185,332 | B1 | * | 2/2007 | Waldin | .................... G06F 8/658 |
| | | | | | 717/170 |
| 8,321,858 | B1 | * | 11/2012 | Marmaros | ................. G06F 8/65 |
| | | | | | 717/173 |
| 9,454,356 | B2 | * | 9/2016 | Qin | ......................... G06F 9/445 |
| 9,692,667 | B2 | | 6/2017 | Qian | |
| 9,715,378 | B2 | * | 7/2017 | Dickerson | ................. G06F 8/65 |

(Continued)

OTHER PUBLICATIONS

Atkinson et al, "Iterative and Incremental Development of Component-Based Software Architectures", ACM, pp. 1-6 (Year: 2012).*

(Continued)

*Primary Examiner* — Anil Khatri

(74) *Attorney, Agent, or Firm* — FIG. 1 Patents

(57) ABSTRACT

In accordance with the described techniques, a configuration update is received changing configuration parameters of a data stream processing application from a source configuration to a target configuration. In addition, the configuration update specifies incremental update parameters indicating how different partitions of the data stream processing application are to be incrementally updated. The computing device is configured to incrementally update the data stream processing application. During a time interval indicated by the incremental update parameters, for instance, the target configuration is applied to a first partition, and the source configuration is applied to a second partition. Thus, during the time interval, the first partition processes events of a data stream in accordance with the target configuration, and the second partition processes events of the data stream in accordance with the source configuration. After the time interval, the target configuration is applied to the second partition.

20 Claims, 8 Drawing Sheets

(56)          References Cited

U.S. PATENT DOCUMENTS

| | | | | |
|---|---|---|---|---|
| 9,892,013 | B2 * | 2/2018 | Tan | G06F 11/323 |
| 10,275,278 | B2 | 4/2019 | Bishop et al. | |
| 10,296,323 | B2 * | 5/2019 | Pink | G06F 9/44521 |
| 10,936,297 | B2 * | 3/2021 | Su | G06F 8/65 |
| 11,734,100 | B2 | 8/2023 | Singhal et al. | |
| 11,775,288 | B2 | 10/2023 | Kang et al. | |
| 12,131,144 | B2 * | 10/2024 | Wang | G06F 8/65 |
| 2015/0134797 | A1 | 5/2015 | Theimer et al. | |
| 2015/0286475 | A1 * | 10/2015 | Vangelov | G06F 8/65 |
| | | | | 717/170 |
| 2020/0236406 | A1 | 7/2020 | Bastian et al. | |
| 2021/0083950 | A1 * | 3/2021 | Bentley | H04L 69/40 |
| 2021/0117217 | A1 | 4/2021 | Croteau et al. | |
| 2023/0216685 | A1 | 7/2023 | Kaimal et al. | |

OTHER PUBLICATIONS

Katta et al, "Incremental Consistent Updates:" ACM, pp. 1-6 (Year: 2013).*

Hicks et al, "Dynamic Software Updating", ACM, pp. 1-48 (Year: 2005).*

Tomasic et al, Incremental Updates of Inverted Lists for Text Document Retrieval, ACM, pp. 1-12 (Year: 1994).*

Andonov, Stefan , et al., "Dynamically Configured Stream Processing In Apache Flink—The use case of custom processing rules management and application", 18th International Conference on Informatics and Information Technologies—CIIT 2021 [retrieved Dec. 11, 2023]. Retrieved from the Internet <http://hdl.handle.net/20.500.12188/14856>, Sep. 23, 2021, 6 pages.

Carbone, Paris , et al., "State management in Apache Flink®: consistent stateful distributed stream processing", Proceedings of the VLDB Endowment, vol. 10, No. 12 [retrieved Dec. 11, 2023]. Retrieved from the Internet <https://doi.org/10.14778/3137765.3137777>, Aug. 1, 2017, 13 pages.

Del Monte, Bonaventura , et al., "Rhino: Efficient Management of Very Large Distributed State for Stream Processing Engines", SIGMOD '20: Proceedings of the 2020 ACM SIGMOD International Conference on Management of Data [retrieved Dec. 11, 2023]. Retrieved from the Internet <https://doi.org/10.1145/3318464.3389723>, Jun. 2020, 2 pages.

* cited by examiner

400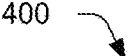

402
Receive a configuration update changing configuration parameters of a data stream processing application from a source configuration to a target configuration, and specifying incremental update parameters indicating how different partitions of the data stream processing application are to be incrementally updated

404
Incrementally update the data stream processing application

406
Apply, during a time interval indicated by the incremental update parameters, the target configuration to a first partition of the data stream processing application

408
Process, during the time interval, events of a data stream in accordance with the target configuration by the first partition

410
Apply, during the time interval, the source configuration to a second partition of the data stream processing application

412
Process, during the time interval, events of the data stream in accordance with the source configuration by the second partition

414
Apply, after the time interval, the target configuration to the second partition

416
Process, after the time interval, events of the data stream in accordance with the target configuration by the first partition and the second partition

Figure 5:
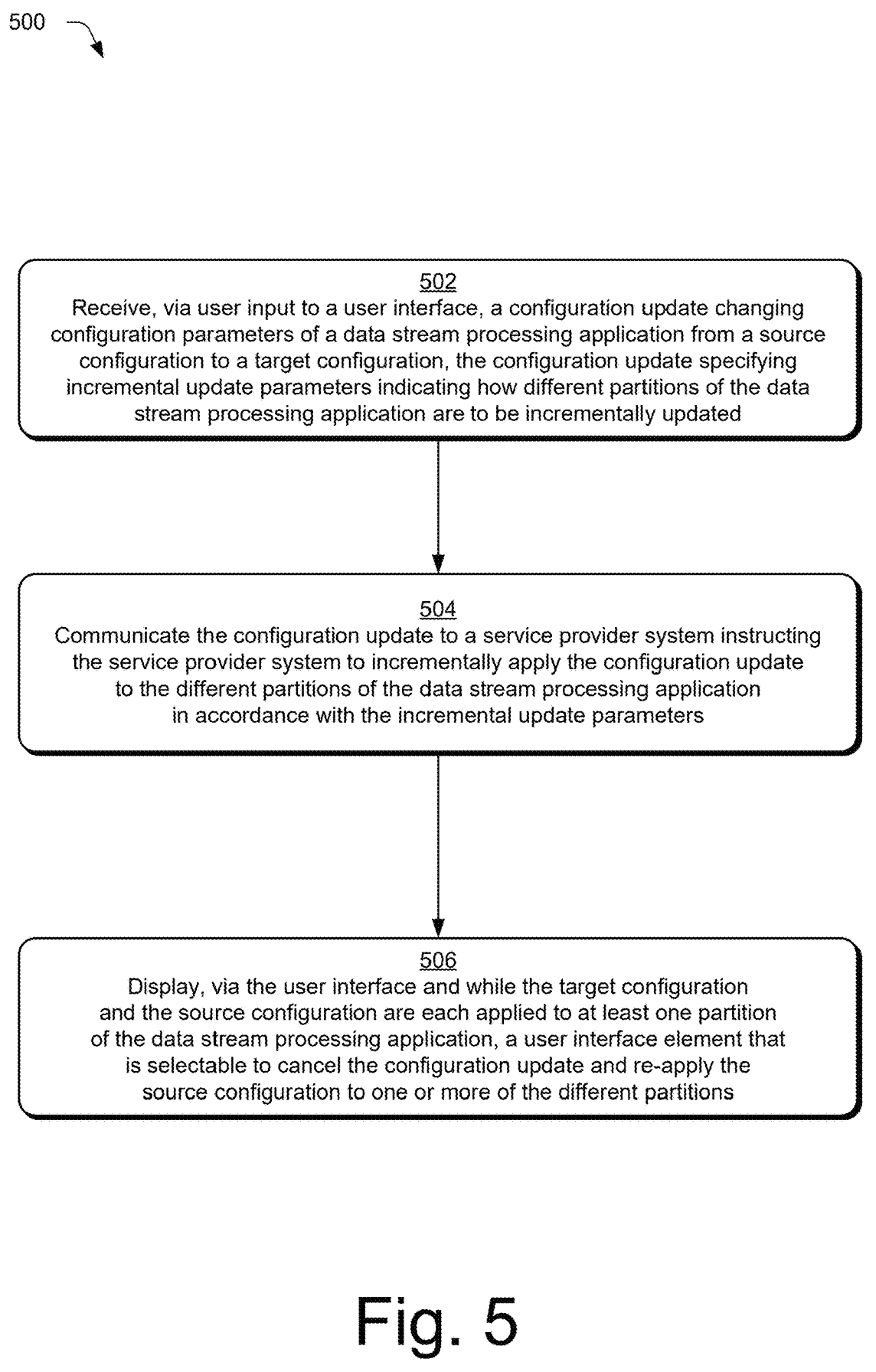

502
Receive, via user input to a user interface, a configuration update changing configuration parameters of a data stream processing application from a source configuration to a target configuration, the configuration update specifying incremental update parameters indicating how different partitions of the data stream processing application are to be incrementally updated

504
Communicate the configuration update to a service provider system instructing the service provider system to incrementally apply the configuration update to the different partitions of the data stream processing application in accordance with the incremental update parameters

506
Display, via the user interface and while the target configuration and the source configuration are each applied to at least one partition of the data stream processing application, a user interface element that is selectable to cancel the configuration update and re-apply the source configuration to one or more of the different partitions

INCREMENTAL CONFIGURATION UPDATES FOR DATA STREAM PROCESSING APPLICATIONS

BACKGROUND

Data stream processing applications process continuous streams of data in real-time as the data is generated. Processing the data includes, but is not limited to, analyzing, filtering, transforming, combining, and cleaning the data. Common use cases for data stream processing applications include fraud detection, internet-of-things (IoT) processing, log and event monitoring, social media analysis, real-time financial risk analysis, and the like. Configuration parameters define how the data stream processing application behaves and processes data of one or more incoming data streams. Developers of data stream processing applications often update the configuration parameters to optimize performance of the data stream processing applications. However, errors often occur during application configuration, resulting in misconfigurations, which negatively impact the performance, security, and stability of the data stream processing application.

SUMMARY

Incremental configuration updates for data stream processing applications are described. These techniques support incrementally applying a configuration update to parallel partitions of a data stream processing application. As part of this, a configuration update is received changing configuration parameters from a source configuration to a target configuration, and specifying incremental update parameters defining how different partitions of the data stream processing application are to be incrementally updated. In one or more implementations, the configuration update is specified via user input to a configuration user interface.

During a first time interval indicated by the incremental update parameters, the target configuration is applied to a first partition, and the source configuration is applied to a second partition. As part of this, the first partition processes events of a data stream in accordance with the target configuration, while the second partition processes events of the data stream in accordance with the source configuration. After the time interval, the target configuration is applied to the second partition, and the first and second partitions process events of the data stream in accordance with the target configuration.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures are indicative of one or more entities and thus reference is made interchangeably to single or plural forms of the entities in the discussion.

FIG. 4 depicts a procedure, implemented by a service provider system, in an example implementation of incremental configuration updates for data stream processing applications.

FIG. 5 depicts a procedure, implemented by a client device, in an example implementation of incremental configuration updates for data stream processing applications.

DETAILED DESCRIPTION

Overview

Figure 1:
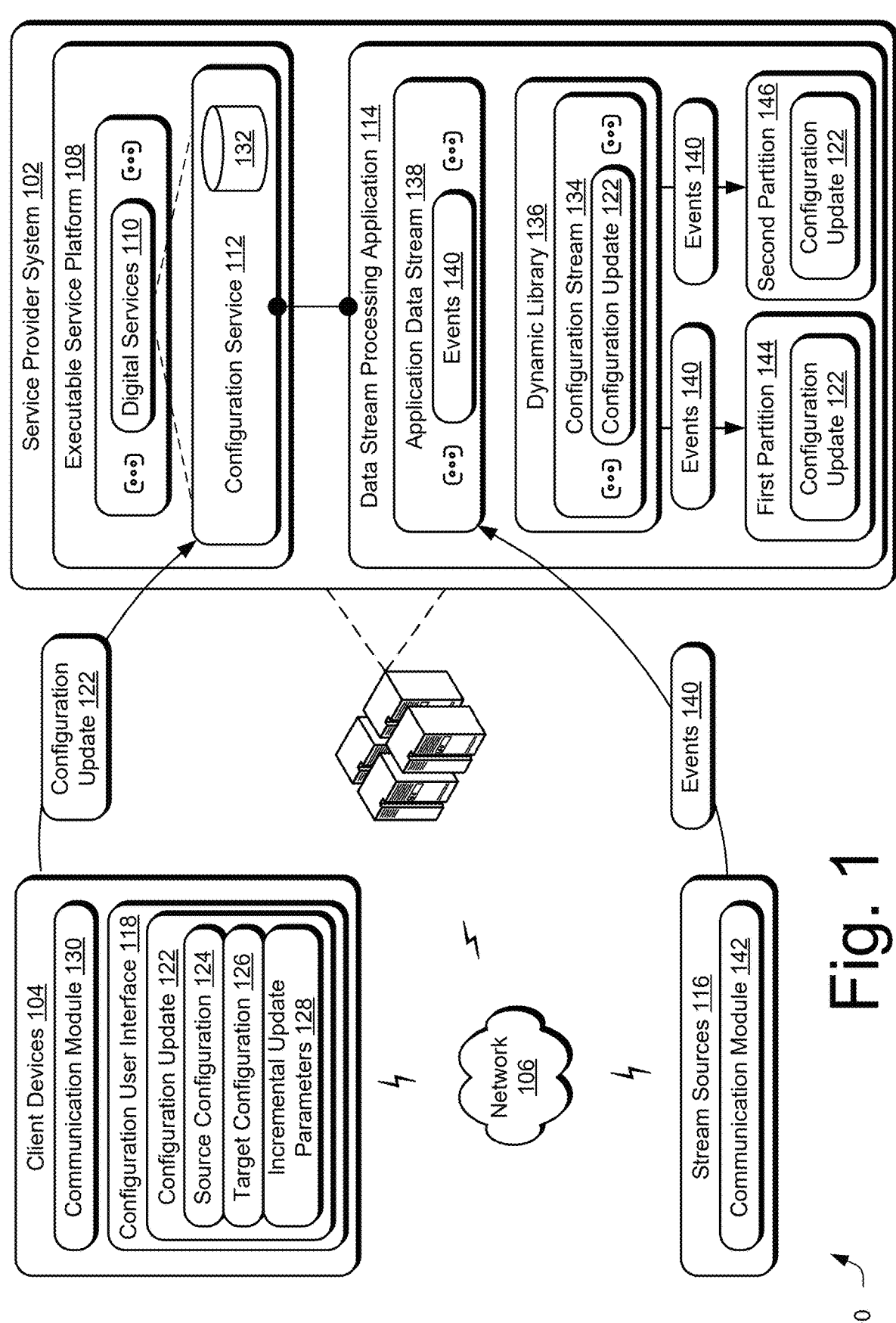
FIG. 1 is an illustration of a digital medium environment in an example implementation that is operable to employ techniques for incremental configuration updates for data stream processing applications.

Data stream processing applications include configuration parameters that are updateable to change the way that the data stream processing applications behave and process data streams. Oftentimes, configuration parameters are consistently being updated by developers seeking to optimize performance of the data stream processing application. Properly configuring a data stream processing application has numerous performance benefits, including but not limited to, improved data integrity, improved data reliability, reduced consumption of system resources, increased computational efficiency, and improved adaptability to changing processing requirements. However, misconfigurations often occur during the configuration process, e.g., over-provisioning or under-provisioning of parallel processing instances, missing or misconfigured data encryption parameters, and inadequate checkpointing frequency. Timely addressing and correcting misconfigurations, therefore, is paramount to the performance, security, and stability of the data stream processing application.

Conventional techniques for configuring data stream processing applications, however, unilaterally apply configuration updates across the entire data stream processing application. Accordingly, misconfigurations of conventional techniques (and the negative consequences thereof) are similarly applied unilaterally across the data stream processing application. In other words, there is no opportunity for a developer to observe the effects of a configuration update on only a portion of the data stream processing application before deciding whether to apply the configuration update to the remainder of the data stream processing application, thereby exacerbating the negative effects of misconfigurations.

Accordingly, incremental configuration updates for data stream processing applications are described herein which overcome the drawbacks of conventional techniques. In accordance with the described techniques, a service provider system and a client device are communicatively coupled, via a network. The service provider system includes a configuration service accessible by the client device, and the configuration service supports functionality for updating and/or editing configuration parameters of data stream processing applications. As part of this, the configuration service exposes, via network communications, a configuration user interface for display by the client device.

Broadly, the configuration user interface is configured to receive user input specifying a configuration update changing configuration parameters of the data stream processing application from a source configuration to a target configuration. Here, the target configuration refers to a new set of configuration parameters that is to be applied incrementally (in accordance with a time interval) to the data stream processing application upon submission of the configuration update. Further, the source configuration is a set of configuration parameters that the data stream processing application is applying at the time the configuration update is submitted.

In addition to the configuration parameters, the configuration user interface receives user input specifying incremental update parameters indicating how the data stream processing application is to be incrementally updated from the source configuration to the target configuration. The incremental update parameters indicate a number of partitions of the data stream processing application that are to be incrementally updated. In one or more implementations, the data stream processing application is implemented by a layer of parallel operators, each configured to perform a same set of processing tasks on events of one or more incoming data streams. Given this, the number of parallel operators to include in each partition of the data stream processing application is another incremental update parameter specifiable via the configuration user interface. Moreover, the incremental update parameters include a time interval to wait between updating the different partitions of the data stream processing application.

Upon submission of the configuration update, the client device communicates the configuration update (including the source configuration, the target configuration, and the incremental update parameters) to the configuration service, which persists the configuration update in storage. In accordance with the described techniques, the configuration service interfaces between the configuration user interface and the data stream processing application, which includes an application data stream and a configuration stream. As part of this, the configuration service exposes an endpoint (e.g., an HTTP endpoint) of the configuration service as a stream source for the configuration stream, and as such, the events of the configuration stream include configuration updates that have been communicated to and persisted by the configuration service.

Furthermore, the events of the application data stream include or correspond to the data that is designed to be processed by the data stream processing application. In one specific but non-limiting example, the application data stream is a real-time social media feed, and the events of the application data stream include social media posts and/or interactions with social media posts, e.g., views, comments, likes, shares, etc.

In one or more implementations, the configuration stream is implemented within a dynamic library of the data stream processing application. The dynamic library is a file that includes compiled code for facilitating communication between the data stream processing application and the configuration service. Upon being accessed, the dynamic library connects the configuration stream to the exposed endpoint of the configuration service, implements the configuration stream as a shared stream, and connects the configuration stream to the application data stream. By doing so, the dynamic library enables the data stream processing application to jointly process the events of the data stream processing application together with the configuration update of the configuration stream.

By implementing the configuration stream as a shared stream, for instance, the most recent configuration update of the configuration stream is shared with all parallel operators in the layer, and each of the parallel operators maintains the configuration update as a state. Furthermore, the events of the application data stream are sent to the parallel operators as the events occur. The parallel operators are configured to process the events of the application data stream as the events are received in accordance with either the source configuration or the target configuration based on the incremental update parameters, e.g., by evaluating the configuration update maintained as the shared state.

In an example, for instance, the incremental update parameters indicate that a first parallel operator and a second parallel operator are included in a first partition to be incrementally updated, while a third parallel operator and a fourth parallel operator are included in a second partition to be incrementally updated. In this example, the incremental update parameters indicate that the time interval to wait between updating the different partitions is twenty minutes. Thus, during a first twenty minute interval, the first and second parallel operators of the first partition apply the target configuration, and process events of the application data stream in accordance with the target configuration. Also during the first twenty minute interval, the third and fourth parallel operators of the second partition apply the source configuration, and process the events of the application data stream in accordance with the source configuration. During the second twenty minute interval, the third and fourth parallel operators of the second partition transition to applying the target configuration, and the parallel operators in both partitions process the events of the data stream in accordance with the target configuration.

While the configuration update is in process (e.g., while the target configuration is applied to at least one partition and the source configuration is applied to at least one partition), the configuration user interface displays a progress update and a user interface element that is selectable to implement a cancel and rollback policy. The progress update indicates which ones of the parallel operators have applied the target configuration, and which ones of the parallel operators are still applying the source configuration. Selection of the user interface element prevents the target configuration from being applied to operators that are still applying the source configuration, and causes operators that have begun applying the target configuration to re-apply the source configuration.

Accordingly, the described techniques incrementally update the data stream processing application with the target configuration partition-by-partition in accordance with developer-specified incremental update parameters. By doing so, developers are able to evaluate the behavior of the data stream processing application as it is incrementally applied. If a misconfiguration is observed, the developer is able to efficiently mitigate the negative consequences by selecting the user interface element to implement the cancel and rollback policy. In sum, the described techniques enable timely detection and correction of misconfigurations before the misconfigurations have been applied to the entire application. The described techniques, therefore, alleviate the negative effects of misconfigurations, thereby improving security, increasing computational efficiency, and reducing resource consumption for the service provider system.

In the following discussion, an example environment is described that employs the techniques described herein.

Example procedures are also described that are performable in the example environment as well as other environments. Consequently, performance of the example procedures is not limited to the example environment and the example environment is not limited to performance of the example procedures.

Example Environment

FIG. 1 is an illustration of a digital medium environment 100 in an example implementation that is operable to employ techniques for incremental configuration updates for data stream processing applications. The illustrated environment 100 includes a service provider system 102 and a plurality of client devices 104 that are communicatively coupled, one to another, via a network 106. Computing devices that implement the service provider system 102 and the client devices 104 are configurable in a variety of ways. A computing device, for instance, is configurable as a desktop computer, a laptop computer, a mobile device (e.g., assuming a handheld configuration such as a tablet or mobile phone), and so forth. Thus, a computing device ranges from full resource devices with substantial memory and processor resources (e.g., personal computers, game consoles) to a low-resource device with limited memory and/or processing resources (e.g., mobile devices). Additionally, a computing device is also representative of a plurality of different devices, such as multiple servers utilized by a business to perform operations "over the cloud" as illustrated for the service provider system 102 and as further described with reference to FIG. 6.

The service provider system 102 includes an executable service platform 108. The executable service platform 108 is configured to implement and manage access to digital services 110 "in the cloud" that are accessible by the client devices 104 via the network 106. Thus, the executable service platform 108 provides an underlying infrastructure to manage execution of digital services 110, e.g., through control of underlying computational resources. The executable service platform 108 supports numerous computational and technical advantages, including an ability of the service provider system 102 to readily scale resources to address wants of an entity associated with the client devices 104. Thus, instead of incurring an expense of purchasing and maintaining proprietary computer equipment for performing certain computational tasks, cloud computing provides the client devices 104 with access to a wide range of hardware and software resources so long as the client has access to the network 106.

Digital services 110 can take a variety of forms. Examples of digital services include social media services, document management services, storage services, media streaming services, content creation services, productivity services, digital marketplace services, auction services, and so forth. In some instances, the digital services 110 include a configuration service 112 that supports functionality for creating and/or editing configurations of data stream processing applications 114.

Broadly, a data stream processing application 114 is a software program designed to process continuous streams of data in real-time as the data is generated. Processing the data includes, but is not limited to, analyzing, filtering, transforming, combining, and cleaning the data. In one or more implementations, the data stream processing application 114 runs on computing devices (e.g., servers) of the service provider system 102. In accordance with data stream processing, data streams are received from various different types of stream sources 116 which are also communicatively coupled to the network 106. Example stream sources 116 include hardware devices, such as internet-of-things (IoT) devices, sensors, and computing devices. Additionally or alternatively, the stream sources 116 include software programs implemented by computing devices, examples of which include real-time social media feeds, real-time financial transaction feeds, and the like.

Once a data stream has been processed by a data stream processing application 114, the processed data stream is output to a stream sink (not shown), such as a storage device or a software program, which stores the processed data and/or makes decisions regarding the operation of the software program based on the processed data. It should be noted that the data stream processing application 114 is built using any one or more of a variety of stream processing frameworks, including but not limited to, Apache Flink, Apache Kafka, Apache Storm, Apache Samza, and Estuary Flow.

In accordance with the described techniques, the configuration service 112 supports functionality for updating configuration parameters applied to a data stream processing application 114. Broadly, configuration parameters define how the data stream processing application 114 behaves and processes data of one or more incoming data streams. Examples of the configuration parameters include, but are not limited to, specifying stream sources 116, stream sinks, and/or connection parameters thereof, updating windowing parameters defining time or event-based windows for processing, updating the underlying logic of the data stream processing application 114 to change operations performed on the one or more incoming data streams, setting up rules, patterns, and conditions for detecting complex events in one or more incoming data streams, and the like.

Properly configuring these parameters within the context of the data stream processing application 114 optimizes the performance of the data stream processing application 114. Potential performance benefits resulting from optimized configuration parameters include, but are not limited to, improved data integrity, improved data reliability, reduced consumption of system resources, increased computational efficiency, and improved adaptability to changing processing requirements.

However, errors often occur during application configuration, resulting in misconfigurations. Common misconfigurations of data stream processing applications 114 include, but are not limited to over-provisioning or under-provisioning of parallel processing instances (leading to resource wastage or performance bottlenecks), missing or misconfigured data encryption parameters (exposing data to security risks), and inadequate checkpointing frequency (resulting in data loss in case of application failures). Thus, addressing misconfigurations in a timely manner maintains the stability, performance, and security of data stream processing applications 114.

In one or more implementations, the configuration service 112 exposes controls for updating the configuration of the data stream processing application 114. For instance, the configuration service 112 causes, via network 106 communications, display of a configuration user interface 118 in a display of the client device 104. As part of this, a developer of the data stream processing application 114 provides input, via the configuration user interface 118, specifying a configuration update 122 changing the configuration parameters of the data stream processing application 114 from a source configuration 124 to a target configuration 126. Additionally or alternatively, a developer of the data stream processing application 114 provides input, via the configuration user interface 118, specifying incremental update parameters 128 defining how different partitions of the data stream processing application 114 are to be incrementally updated. In at least one example, the incremental update parameters 128 include a time interval to wait between changing the configuration parameters of different partitions of the data stream processing application 114, e.g., to the target configuration 126.

As shown, the client device 104 includes a communication module 130 having functionality to send communications, such as the configuration update 122, to the service provider system 102 over the network 106. In particular, the configuration update 122 is received by the configuration service 112, which persists the configuration update 122 (including the source configuration 124, the target configuration 126, and the incremental update parameters 128) in storage 132. In addition, the configuration service 112 exposes an endpoint (e.g., an HTTP endpoint) of the configuration service 112 as the stream source 116 for a configuration stream 134 of the data stream processing application 114. Accordingly, each time a new configuration update 122 is received, the configuration update 122 becomes an event in the configuration stream 134, i.e., the configuration stream 134 is a stream of configuration updates 122. Therefore, the configuration service 112 represents functionality for interfacing between the configuration user interface 118 and the data stream processing application 114, as shown.

As shown, the configuration stream 134 is implemented within a dynamic library 136 of the data stream processing application 114. The dynamic library 136 is a file that includes compiled code for facilitating communication between the data stream processing application 114 and the configuration service 112, e.g., including obtaining the configuration updates 122 from the configuration service 112. Although one data stream processing application 114 is depicted in the illustrated example, the configuration service 112 services multiple data stream processing applications 114, in variations. Given this, each respective data stream processing application 114 includes a dynamic library 136, which acts as a communication agent facilitating communication between the respective data stream processing application 114 and the configuration service 112.

As shown, the data stream processing application 114 further includes an application data stream 138. Events of the application data stream 138 include or correspond to the data that is to be processed by the data stream processing application 114. To obtain the events 140 of the application data stream 138, the application data stream 138 is connected to one or more stream sources 116. Further, the stream sources 116 include a communication module 142 having functionality to send communications, such as the events 140, to the service provider system 102 over the network 106. In at least one example, the stream sources 116 include real-time social media feeds of a social media application, and the events 140 of the application data stream 138 include social media posts and/or interactions with social media posts, e.g., views, comments, likes, shares, etc.

Moreover, the data stream processing application 114 is illustrated as including a first partition 144 and a second partition 146, and the partitions 144, 146 provide the underlying functionality for processing (e.g., analyzing, filtering, transforming, combining, cleaning) data of one or more incoming data streams. In one or more implementations, the partitions 144, 146 are parallel in nature, meaning that the first partition 144 and the second partition 146 are both configured to perform a same set of data processing tasks. In various examples, however, the different partitions 144, 146 apply different configurations 124, 126 in processing the data of the incoming data streams, as further discussed below. Although examples are depicted and described herein involving just two partitions of the data stream processing application 114, it is to be appreciated that the data stream processing application 114 is divisible into any number of partitions without departing from the spirit or scope of the described techniques.

When the dynamic library 136 is accessed by the data stream processing application 114, the dynamic library 136 connects the configuration stream 134 to the exposed endpoint (e.g., HTTP endpoint) of the configuration service 112, and obtains, as an event of the configuration stream 134, the most recent configuration update 122 specified via the configuration user interface 118. In one or more implementations, the dynamic library 136 implements the configuration stream 134 as a shared stream. Broadly, implementing the configuration stream 134 as a "shared" stream, as described herein, means that the events of the configuration stream 134 (e.g., the configuration updates 122) are shared with each of the different partitions 144, 146, and the different partitions 144, 146 maintain the configuration updates 122 as states. In addition, the dynamic library 136 provides the underlying logic for connecting the configuration stream 134 to the application data stream 138, which also occurs when the dynamic library 136 is accessed.

By implementing the configuration stream 134 as a shared stream and connecting the configuration stream 134 with the application data stream 138 using the dynamic library 136, the data stream processing application 114 is able to jointly process the events 140 of the application data stream 138 together with the configuration update 122 of the configuration stream 134. Since the configuration stream 134 is a shared stream, for instance, the latest configuration update 122 is shared with each partition of the data stream processing application 114, and each partition 144, 146 maintains the configuration update 122 as a state. Meanwhile, the events 140 of the application data stream 138 are sent to the different partitions 144, 146 for processing as the events 140 occur. In this way, the partitions 144, 146 are able to determine whether to apply the source configuration 124 or the target configuration 126 based on the incremental update parameters 128, and process the events 140 as they are received using the determined configuration 124, 126.

Although one application data stream 138 is shown in the illustrated example, it is to be appreciated that the data stream processing application 114 includes multiple application data streams 138 in variations. In such scenarios, the dynamic library 136 connects each of the application data streams 138 with the configuration stream 134, and jointly processes the events 140 of each of the data streams 138 together with the configuration update 122 of the configuration stream 134. Since the configuration update 122 is maintained as a state of the different partitions 144, 146, for instance, the configuration update 122 is shared with the multiple application data streams 138 as the events thereof pass through the different partitions 144, 146. For example, the events 140 of the various application data streams 138 are sent to the different partitions 144, 146 as the events 140 occur. Further, the partitions 144, 146 determine whether to apply the source configuration 124 or the target configuration 126 based on the incremental update parameters 128, and process the events 140 of the multiple application data streams 138 using the determined configuration 124, 126.

Consider an example in which the time interval specified by the incremental update parameters 128 indicates that the different partitions 144, 146 are to be incrementally updated with the target configuration 126 every twenty minutes. In this example, the incremental update parameters 128 indicate that the first partition 144 is the first partition to be updated, and the second partition 146 is the next partition temporally to be updated. Thus, during a first twenty minute interval, the first partition 144 applies the target configuration 126 and processes the events 140 in accordance with the target configuration 126. Also during the first twenty minute interval, the remaining partitions (e.g., including the second partition 146) apply the source configuration 124 and process the events 140 in accordance with the source configuration 124. During a second twenty minute interval, the second partition 146 transitions to applying the target configuration 126, and the first and second partitions 144, 146 process the events 140 in accordance with the target configuration 126. Meanwhile, the remaining partitions continue processing the events 140 using the source configuration 124. This process is repeated until all partitions are updated with the target configuration 126, or until the user cancels and rolls back the configuration update 122, e.g., in case of a misconfiguration.

Conventional techniques for updating configuration parameters of a data stream processing application unilaterally apply configuration updates across the entire data stream processing application. As previously mentioned, misconfigurations are detrimental to the stability, performance, and security of data stream processing applications. Since configuration updates are unilaterally applied across an entire data stream processing application, misconfigurations (and the negative effects thereof) are similarly applied unilaterally across the entire application for conventional techniques. In other words, there is no opportunity for a developer to observe the effects of a configuration update on only a partition of the data stream processing application.

This contrasts with the described techniques which incrementally apply the target configuration 126 partition-by-partition. By doing so, developers are able to observe and evaluate the behavior of the data stream processing application 114 as it is incrementally applied to different partitions 144, 146. Thus, if a misconfiguration is observed, the developer can cancel a configuration update 122 to prevent the target configuration 126 from being applied to partitions that have not been updated, and rollback the configuration update 122 to re-apply the source configuration 124 to partitions that have been updated. In one or more implementations, the cancel and rollback policy is initiated via a user selection of a user interface element of the configuration user interface 118. Accordingly, the described techniques enable detection and correction of misconfigurations before the misconfigurations have been applied to the entire application, thereby alleviating the negative effects of misconfigurations and improving performance of the service provider system 102 implementing the data stream processing application 114.

In general, functionality, features, and concepts described in relation to the examples above and below are employed in the context of the example procedures described in this section. Further, functionality, features, and concepts described in relation to different figures and examples in this document are interchangeable among one another and are not limited to implementation in the context of a particular figure or procedure. Moreover, blocks associated with different representative procedures and corresponding figures herein are applicable together and/or combinable in different ways. Thus, individual functionality, features, and concepts described in relation to different example environments, devices, components, figures, and procedures herein are usable in any suitable combinations and are not limited to the particular combinations represented by the enumerated examples in this description.

Incremental Configuration Updates for Data Stream Processing

Figure 2:
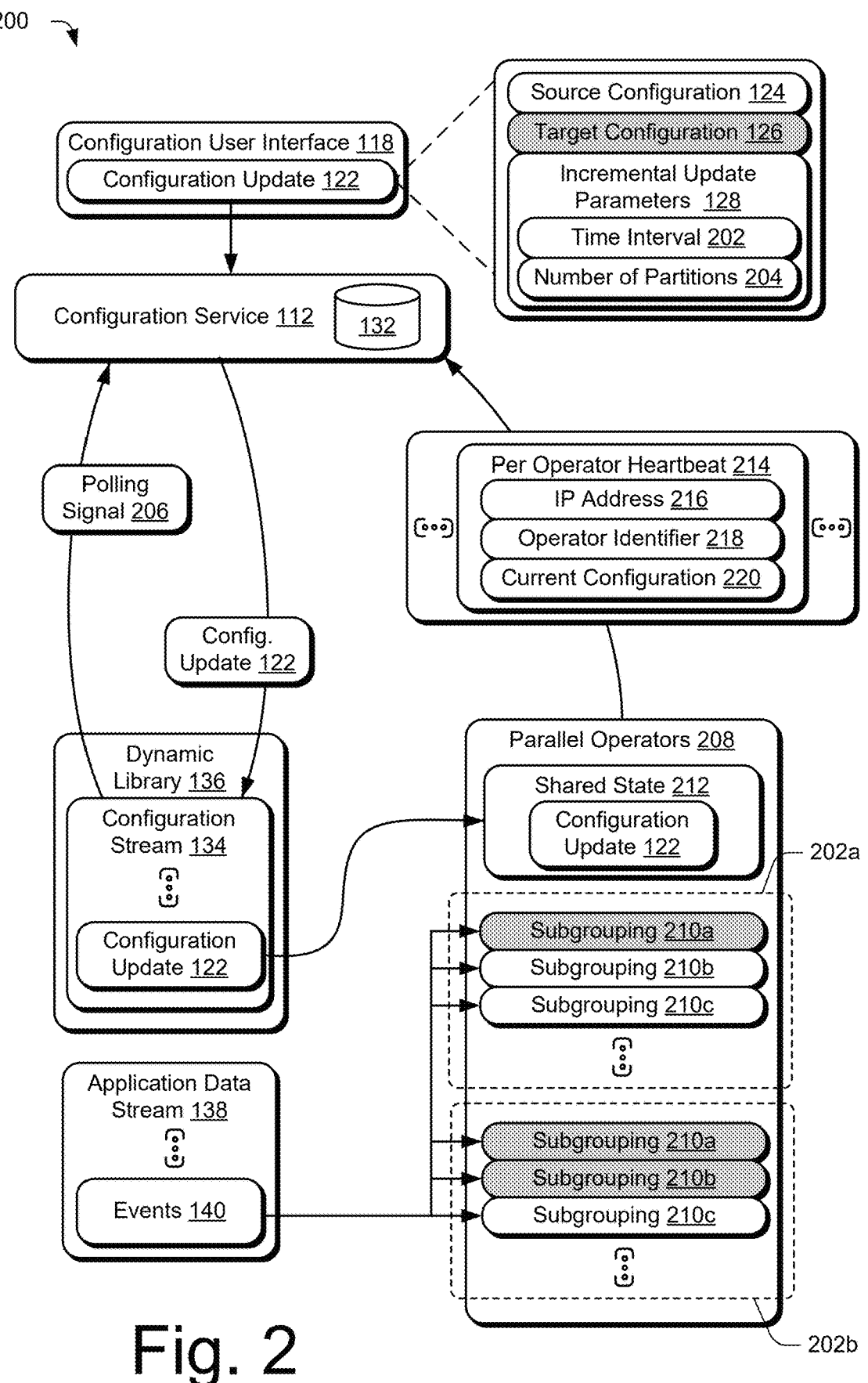
FIG. 2 depicts a system in an example implementation showing operation of a configuration service to incrementally update configuration parameters of a data stream processing application.

FIG. 2 depicts a system 200 in an example implementation showing operation of a configuration service to incrementally update configuration parameters of a data stream processing application. In accordance with the described techniques, the configuration service 112 receives a configuration update 122 from the configuration user interface 118. As shown, the configuration update 122 includes the source configuration 124, the target configuration 126, and the incremental update parameters 128. In the illustrated example, the target configuration 126 is depicted with a gray color fill, while the source configuration 124 is depicted with a white color fill. Further, the incremental update parameters 128 include a time interval 202 to wait between changing the configuration parameters of different partitions of the data stream processing application 114. In addition, the incremental update parameters 128 include a number of partitions 204 to which the configuration update 122 is to be incrementally applied. Further discussion regarding operation of the configuration user interface 118 is provided below with reference to FIGS. 3A, 3B, and 3C.

Upon receiving the configuration update 122, the configuration service 112 persists the configuration update 122 in storage 132. As part of accessing the dynamic library 136, a source connector of the configuration stream 134 is connected to the exposed endpoint (e.g., the HTTP endpoint) of the configuration service 112. In this way, the configuration stream 134 is able to periodically send polling signals 206 to the configuration service 112 (e.g., in accordance with a time interval). Notably, each configuration update 122 is timestamped with a time of receipt. Therefore, whenever a polling signal 206 is received, the configuration service 112 responds with the latest configuration update 122 persisted in storage 132, as indicated by the timestamp.

Each time that a polling response includes a different configuration update 122, the configuration stream 134 adds, as a new event of the configuration stream 134, the different configuration update 122. In other words, it is possible for the latest configuration update 122 persisted in storage 132 to be the same over consecutive polling intervals, and the configuration stream 134 solely adds a polled configuration update 122 as a new event if it is different from the latest configuration update 122 in the configuration stream 134.

As shown, the data stream processing application 114 includes a layer of parallel operators 208, e.g., also referred to as subtasks. For example, each of the parallel operators 208 in the layer are configured to perform a same set of data processing tasks on the events 140 of the application data stream 138. Furthermore, the layer of parallel operators 208 are divided into subgroupings 210a, 210b, 210c, and each subgrouping includes one or more parallel operators 208. In other words, each of the subgroupings 210a, 210b, 210c correspond to, or are included as part of, different parallel partitions of the data stream processing application 114. In one or more implementations, the number of subgroupings/partitions, and the number of parallel operators 208 in each of the subgroupings 210a, 210b, 210c are examples of incremental update parameters 128 specifiable via user input to the configuration user interface 118.

As previously mentioned, the configuration stream 134 is implemented as a shared stream, and is connected to the application data stream 138 using the dynamic library 136. As part of this, the configuration stream 134 shares the most recent configuration update 122 of the configuration stream 134 with each of the parallel operators 208 in the layer. Further, each of the parallel operators 208 maintain the configuration update 122 as a shared state 212, as shown.

Moreover, the events 140 of the application data stream 138 are passed to the parallel operators 208 in the layer. Given a particular event 140 of the application data stream 138, for example, the particular event 140 is passed to each parallel operator 208 in the layer, and each parallel operator 208 is configured to perform the same set of processing tasks on the event 140. However, the parallel operators 208 of different subgroupings 210a, 210b, 210c process the events 140 of the application data stream 138 using different configurations 124, 126 during different time intervals 202.

During a first time interval 202a, for instance, the first subgrouping 210a processes the events 140 in accordance with the target configuration 126 (as illustrated by the gray color fill), while the remaining subgroupings process the events 140 in accordance with the source configuration 124 (as illustrated by the white color fill). During a second time interval 202b, the first and second subgroupings 210a, 210b process the events 140 in accordance with the target configuration 126 (as illustrated by the gray color fill), while the remaining subgroupings process the events 140 in accordance with the source configuration 124 (as illustrated by the white color fill), and so on until all subgroupings have applied the target configuration 126.

To determine which configuration 124, 126 to apply, the parallel operators 208 leverage the incremental update parameters 128 of the configuration update 122 maintained in the shared state 212. For instance, the incremental update parameters 128 indicate which parallel operators 208 are in the first subgrouping 210a to be incrementally updated, which parallel operators 208 are in the second subgrouping 210b to be incrementally updated, which parallel operators 208 are in the third subgrouping 210c to be incrementally updated, and so on. Given this, the parallel operators 208 in the first subgrouping 210a determine to begin applying the target configuration 126 during the first time interval 202a, the parallel operators 208 in the second subgrouping 210b determine to begin applying the target configuration 126 during the second time interval 202b, the parallel operators 208 in the third subgrouping 210c determine to begin applying the target configuration 126 during the third time interval, and so on.

Further, the parallel operators 208 determine which time interval the configuration update 122 is currently in by comparing the time interval 202 to an amount of time that has elapsed since a time of receipt of the configuration update 122, e.g., when the configuration update 122 was initially shared with the parallel operators 208. Thus, when a particular time interval 202 begins, the parallel operators 208 in the corresponding subgrouping transition from the source configuration 124 to processing the events 140 in accordance with the target configuration 126. In an example in which the time interval 202 is twenty minutes, the parallel operators 208 determine that the configuration update 122 is in a second time interval 202b based on between twenty and forty minutes having elapsed since the configuration update 122 was received by the parallel operators 208.

Although the illustrated example is depicted and described with reference to just one layer of parallel operators 208, it is to be appreciated that the described techniques are extendable to more than one layer of parallel operators in variations. By way of example, downstream layers of parallel operators 208 are similarly divided into subgroupings, and the operators at each layer similarly receive and maintain the configuration update 122 as a shared state. Given this, the operators of different layers are grouped into the first subgrouping 210a and process the events 140 in accordance with the target configuration 126 starting during the first time interval 202a, the operators of different layers are grouped into the second subgrouping 210b and process the events 140 in accordance with the target configuration 126 starting during the second time interval 202b, and so on. Notably, each layer of downstream operators performs a different set of one or more processing tasks, and process the processed events 140 as received from (and processed by) upstream operators 208.

In accordance with the described techniques, each individual parallel operator 208 is registered with the configuration service 112. By doing so, each of the parallel operators 208 is able to periodically (e.g., in accordance with a time interval) send per operator heartbeats 214 to the configuration service 112. As shown, the per operator heartbeat 214 of a respective operator includes an IP address 216 indicating the layer of parallel operators 208 to which the respective operator belongs, an operator identifier 218 indicating which one of the parallel operators 208 in the layer is sending the heartbeat 214, and a current configuration 220 indicating whether the respective operator is currently processing the events 140 in accordance with the source configuration 124 or the target configuration 126. Logs of per operator heartbeats 214 are persisted in storage 132, e.g., a log is persisted for each parallel operator 208. Further, the logs of per operator heartbeats are leveraged by the configuration service 112 to update the configuration user interface 118 while the configuration update 122 is being applied, as further discussed below with reference to FIG. 3C.

It should be noted that, in one or more implementations, a respective layer of parallel operators 208 runs on a single physical machine (e.g., a computing device) of the service provider system 102, hence the same IP address 216 across all parallel operators 208 of a respective layer. Further, individual parallel operators 208 in the respective layer are independently executable via different virtualizations, e.g., different threads of execution, different virtual machines, and/or different containers. In some scenarios, the service provider system 102 allocates different physical machines for the respective layer of parallel operators 208 at different times, e.g., based on load-balancing concerns, or if a physical machine fails. Thus, to conserve system resources in the storage 132, the configuration service 112 is configured to purge the logs of per operator heartbeats 214 of a respective operator based on the respective operator having not sent a heartbeat 214 for a threshold amount of time.

Although examples are depicted and discussed herein with respect to two configurations 124, 126 coexisting in different partitions of the data stream processing application 114, it is to be appreciated that the techniques discussed herein are extendable to three or more configurations coexisting in different partitions of the data stream processing application 114. In one example, the incremental update parameters 128 indicate to incrementally transition from applying the source configuration 124 to applying a first target configuration, and then applying a second target configuration.

For example, during a first time interval, the parallel operators 208 in the first subgrouping 210a apply the first target configuration, while the remaining subgroupings apply the source configuration. During a second time interval, the parallel operators 208 in the first subgrouping 210a apply the second target configuration, the parallel operators 208 in the second subgrouping 210b apply the first target configuration, and the remaining subgroupings apply the source configuration. During a third time interval, the parallel operators 208 in the first and second subgroupings 210a, 210b, apply the second target configuration, the parallel operators 208 in the third subgrouping 210c apply the first target configuration, and the remaining subgroupings apply the source configuration, and so on.

Figure 3A:
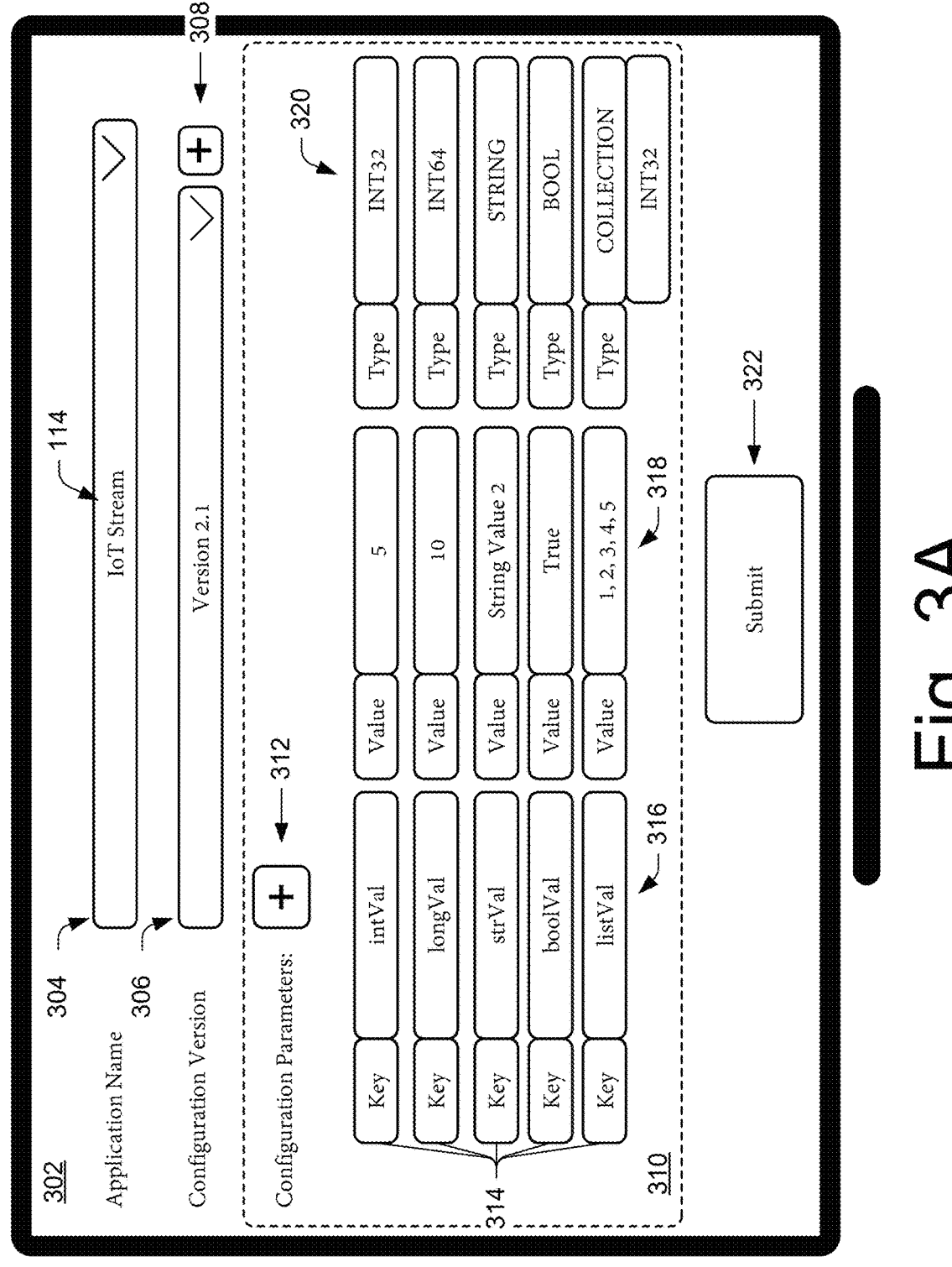
FIGS. 3A, 3B, and 3C depict an example showing operation of a configuration user interface for specifying a configuration update in accordance with the described techniques.
Figure 3B:
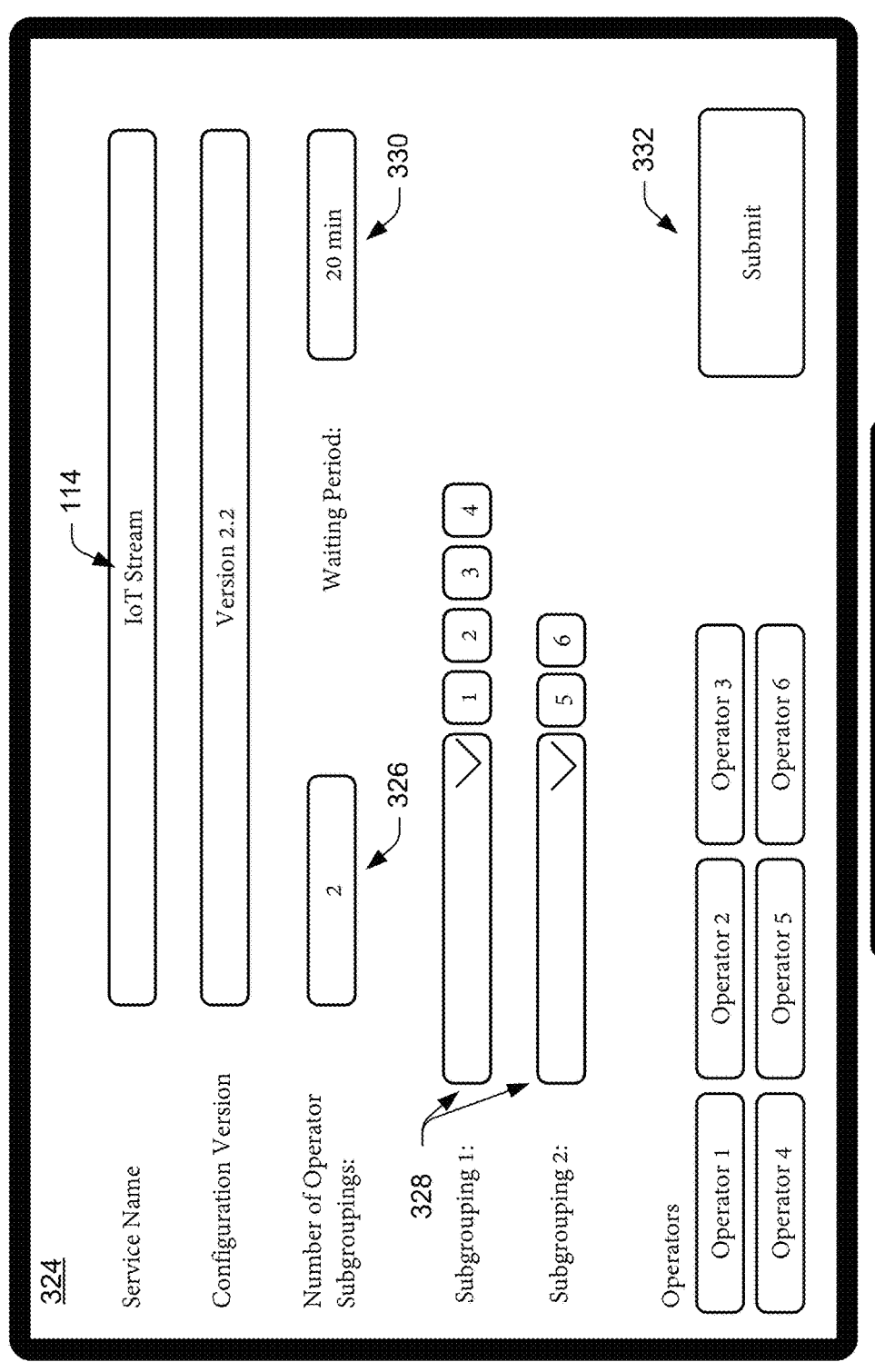
Figure 3C:
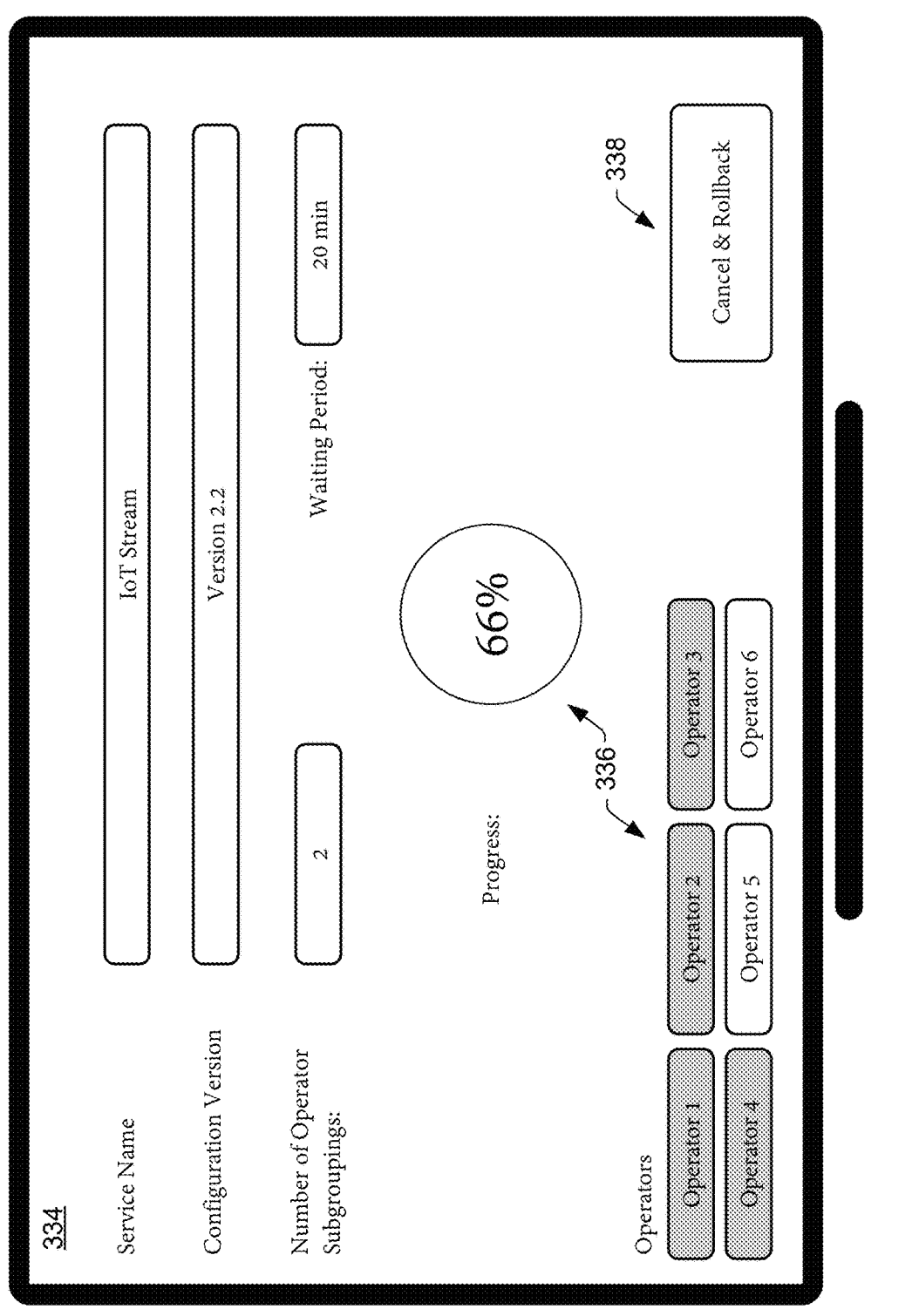

FIGS. 3A, 3B, and 3C depict an example 300 showing operation of a configuration user interface for specifying a configuration update in accordance with the described techniques. In particular, FIG. 3A depicts a first display 302 of the configuration user interface 118. As shown, the first display 302 includes an application input field 304 via which a developer selects a particular data stream processing application 114 to which the configuration update 122 is to be applied. In one or more examples, the configuration service 112 determines a particular developer accessing the configuration service 112, e.g., based on an IP address of the client device 104 and/or login credentials provided as part of accessing the configuration service 112. Further, the service 112 causes the application input field 304 to display (e.g., via a drop-down menu) the data stream processing applications 114 developed by the particular developer. Here, user input is provided selecting the data stream processing application 114 "IoT stream."

Furthermore, the first display 302 includes a version input field 306. As previously mentioned, the configuration service 112 persists the configuration update 122 in storage 132 each time a new configuration update 122 is received. In other words, the configuration service 112 persists a configuration version history, including each configuration previously employed by the data stream processing application 114. Given this, the version input field 306 enables a developer to select a particular version of the data stream processing application 114 to update and apply as the target configuration 126. Additionally or alternatively, a user interface element 308 is selectable to create a new configuration version entirely. Here, the target configuration 126 corresponds to the new configuration version or the selected configuration version having updated configuration parameters, and the source configuration 124 is whichever version the data stream processing application 114 is implementing immediately before the configuration update 122 is submitted.

Furthermore, the first display 302 includes a configuration parameter update region 310 via which the developer provides input adding (e.g., via the user interface element 312) and/or changing configuration parameters of the specified configuration version. More specifically, the configuration parameter update region 310 includes a plurality of entries 314, each representing a configuration parameter of the data stream processing application 114. Furthermore, each of the entries 314 include a key-value pair, as well as a type for the value. Here, the key represents an identifier of a portion of logic of the data stream processing application 114, the value indicates how the portion of logic behaves, and the type for the value indicates which value type or reference type defines the value. Although the types INT32, INT64, STRING, BOOL, and COLLECTION are depicted in the illustrated example, it is to be appreciated that the described techniques support any one or more of a variety of non-depicted value types and reference types without departing from the spirit or scope of the described techniques. It should also be noted that COLLECTION value types include a second value type for values contained within the collection, as shown.

In accordance with the described techniques, the developer provides input via key input fields 316, value input fields 318, and type input fields 320 specifying the configuration update parameters that are to be applied as part of the target configuration 126. Upon receiving user input selecting the user interface element 322, the configuration service 112 causes display of a second display 324 in the configuration user interface 118, as shown in FIG. 3B. While the first display 302 of FIG. 3A provides functionality for inputting the configuration parameters of the configuration update 122, the second display 324 of FIG. 3B provides functionality for inputting the incremental update parameters 128.

More specifically, the second display 324 includes a partition input field 326, via which the developer provides user input specifying the number of partitions 204 (e.g., the number of subgroupings of the parallel operators 208) that are to be incrementally updated with the target configuration 126. Here, the developer specifies two subgroupings of parallel operators 208, and in response, the configuration service 112 causes the configuration user interface 118 to display two operator input fields 328. For example, the operator input field 328 for the "Subgrouping 1" is manipulable to select which parallel operators 208 to include in the first subgrouping 210a, and the operator input field 328 for the "Subgrouping 2" is manipulable to select which parallel operators 208 to include in the second subgrouping 210b. In the illustrated example, the layer of parallel operators 208 includes six operators, and the developer has provided input grouping operator 1, operator 2, operator 3, and operator 4 into the first subgrouping 210a. In addition, the developer has provided input grouping operator 5 and operator 6 into the second subgrouping 210b.

Although the configuration user interface 118 is depicted and described as providing functionality for specifying particular operators 208 as belonging to particular subgroupings, the operators 208 are groupable in other ways. By way of example, the developer specifies, via user input to the operator input fields 328, a percentage of operators 208 that are to be included in each of the subgroupings, and the configuration service 112 automatically groups the operators 208 based on the specified percentages.

In addition, the second display 324 includes an interval input field 330 manipulable to specify the time interval 202 to wait between incrementally updating the different partitions of the data stream processing application 114. Here, twenty minutes is specified as the time interval 202. In sum, the incremental update parameters 128 specified via the second display 324 indicate to apply the target configuration 126 to a first subgrouping of four parallel operators 208, wait twenty minutes, and then apply the target configuration 126 to a second subgrouping of two parallel operators 208. Upon receiving user input selecting the user interface element 332, the specified configuration update 122 begins, and the configuration service 112 causes display of a third display 334 in the configuration user interface 118 while the configuration update 122 is in process, as shown in FIG. 3C.

In particular, the third display 334 is displayed while the target configuration has been applied to the first subgrouping 210a of parallel operators 208, but has not yet been applied to the second subgrouping 210b of parallel operators 208. As shown, the third display 336 includes a progress update, generally at 336, indicating which parallel operators 208 have applied the target configuration 126, and which parallel operators 208 are still applying the source configuration 124. By way of example, the parallel operators 208 of the first subgrouping (e.g., operator 1, operator 2, operator 3, operator 4) are illustrated with a gray color fill indicating that the target configuration 126 has been applied, while the parallel operators of the second subgrouping (e.g., operator 5, operator 6) are illustrated with a white color fill indicating that source configuration 124 is still applied. Additionally or alternatively, the progress update includes a percentage of the parallel operators 208 to which the target configuration 126 has been applied, as shown.

In accordance with the described techniques, this functionality of the configuration user interface 118 is enabled by the per operator heartbeats 214 periodically sent by the individual parallel operators 208. In response to receiving a per operator heartbeat 214, for instance, the configuration service 112 determines which layer of parallel operators 208 the heartbeat 214 applies to (e.g., based on the IP address 216), which parallel operator 208 in the layer that the heartbeat 214 applies to (e.g., based on the operator identifier 218), and whether the source configuration 124 or the target configuration 126 is applied to the particular operator 208, e.g., based on the current configuration 220. Given this, the configuration service 112 determines target operators 208 that are applying the target configuration 126, and source operators 208 that are applying the source configuration 124. Further, the configuration service 112 causes the configuration user interface 118 to display the target operators 208 with the gray color fill, and the source operators 208 with the white color fill.

In addition, the third display 334 includes a user interface element 338 that is selectable to initiate a cancel and rollback policy. In response to receiving a user selection of the user interface element 338, for instance, the configuration service 112 communicates an indication of the selection to the data stream processing application 114. The communication of the selection causes the data stream processing application 114 to prevent the target configuration 126 from being applied to operators 208 that have not applied the target configuration 126 (e.g., operator 5 and operator 6), and re-apply the source configuration 124 to operators 208 that have applied the target configuration 126, e.g., operator 1, operator 2, operator 3, and operator 4. Therefore, the user interface element 338 enables a developer to quickly alleviate the negative consequences of a misconfiguration.

Example Procedures

The following discussion describes techniques that are configured to be implemented utilizing the previously described systems and devices. Aspects of each of the procedures are configured for implementation in hardware, firmware, software, or a combination thereof. The procedures are shown as a set of blocks that specify operations performed by one or more devices and are not necessarily limited to the orders shown for performing the operations by the respective blocks. In portions of the following discussion, reference is made to FIGS. 1-3C.

FIG. 4 depicts a procedure 400, implemented by a service provider system, in an example implementation of incremental configuration updates for data stream processing applications.

A configuration update is received changing configuration parameters of a data stream processing application from a source configuration to a target configuration, and specifying incremental update parameters indicating how different partitions of the data stream processing application are to be incrementally updated (block 402). By way of example, the configuration service 112 receives the configuration update 122 specified via the configuration user interface 118. The configuration update 122 indicates to incrementally update the configuration parameters of the data stream processing application 114 from the source configuration 124 to the target configuration 126 in accordance with incremental update parameters 128. In examples, the incremental update parameters 128 include a number of partitions 204 (e.g., a number of subgroupings of parallel operators 208) that are to be incrementally updated, which parallel operators 208 to include in each partition, and a time interval 202 to wait between updating the different partitions.

The data stream processing application is incrementally updated (block 404). As part of this, the target configuration is applied to a first partition of the data stream processing application during a time interval indicated by the parameters (block 406), and events of a data stream are processed during the time interval in accordance with the target configuration by the first partition (block 408). For example, the configuration update 122 is added, as an event of the configuration stream 134, and the configuration stream 134 is connected to the application data stream 138 using the dynamic library 136. Further, the configuration update 122 is shared with a layer of parallel operators 208, each of which maintaining the configuration update 122 as a state, e.g., a shared state 212. Moreover, the events 140 of the application data stream 138 are sent to the layer of parallel operators 208 as the events 140 occur. Therefore, the parallel operators 208 in a first subgrouping 210a (e.g., a first partition 144) determine to apply the target configuration 126 during a first time interval 202a based on the incremental update parameters 128 included as part of the shared state 212. As such, the parallel operators 208 in the first subgrouping 210a process the incoming events 140 of the application data stream 138 in accordance with the target configuration 126 during the first time interval 202a.

As part of incrementally updating the data stream processing application, the source configuration is applied to a second partition of the data stream processing application during the time interval (block 410), and events of the data stream are processed during the time interval in accordance with the source configuration by the first partition (block 412). By way of example, the parallel operators 208 in a second subgrouping 210b (e.g., a second partition 146) determine to apply the source configuration during the first time interval 202a based on the incremental update parameters 128 included as part of the shared state 212. Therefore, the parallel operators 208 in the second subgrouping 210b process the incoming events 140 of the application data stream 138 in accordance with the source configuration 124 during the first time interval 202a.

As part of incrementally updating the data stream processing application, the target configuration is applied to the second partition after the time interval (block 414), and the events of the data stream are processed after the time interval in accordance with the target configuration by the first partition and the second partition (block 416). By way of example, the parallel operators 208 in the second subgrouping 210b (e.g., a second partition 146) determine to apply the target configuration during the second time interval 202b based on the incremental update parameters 128 included as part of the shared state 212. Notably, the first and second subgroupings 210a, 210b of parallel operators 208 (e.g., the first and second partitions 144, 146) are applying the target configuration 126 during the second time interval 202b. Thus, the parallel operators 208 in the first and second subgroupings 210*a*, 210*b* process the incoming events 140 of the application data stream 138 in accordance with the target configuration 126 during the second time interval 202*b*.

FIG. 5 depicts a procedure 500, implemented by a client device, in an example implementation of incremental configuration updates for data stream processing applications.

A configuration update is received via user input to a user interface changing the configuration parameters of a data stream processing application from a source configuration to a target configuration, the configuration update specifying incremental update parameters indicating how different partitions of the data stream processing application are to be incrementally updated (block 502). By way of example, the configuration service 112 causes, via network 106 communications, the client device 104 to display the configuration user interface 118. In particular, the client device 104 displays the first display 302. Via the first display 302, for instance, a developer (e.g., a user of the client device 104) selects the data stream processing application 114 and the configuration version thereof, and inputs (e.g., adds or changes) one or more configuration parameters of the selected configuration version. Via the second display 324, for instance, the developer inputs incremental update parameters 128 indicating how different partitions of the data stream processing application 114 are to be incrementally updated.

The configuration update is communicated to a service provider system instructing the service provider system to incrementally apply the configuration update to different partitions of the data stream processing application in accordance with the incremental update parameters (block 504). By way of example, the client device 104 uses the communication module 130 to communicate the configuration update 122 to the configuration service 112 of the service provider system 102. The configuration service 112 is a stream source for the configuration stream 134 of the data stream processing application 114, and as such, the configuration update 122 is added as a new event of the configuration stream 134 of the data stream processing application 114. Given this, the data stream processing application 114 incrementally applies the target configuration 126 to different partitions of the data stream processing application 114 based on the incremental update parameters 128. For instance, the data stream processing application 114 performs the procedure 400 to incrementally apply the configuration update 122.

A user interface element is displayed via the user interface while the target configuration and the source configuration are each applied to at least one partition of the data stream processing application, and the user interface element is selectable to cancel the configuration update and re-apply the configuration update to one or more of the different partitions (block 506). By way of example, the configuration service 112 causes, via network 106 communications, the client device 104 to display the third display 334 of the configuration user interface 118. While the configuration update 122 is in progress (e.g., the source configuration 124 and the target configuration 126 are each applied to at least one partition), the third display 334 includes a user interface element 338 that is selectable to cancel and rollback the configuration update 122. In particular, selection of the user interface element 338 prevents operators 208 that are still applying the source configuration 124 from applying the target configuration 126, and re-applies the source configuration 124 to operators 208 that are applying the target configuration 126.

Example System and Device

Figure 6:
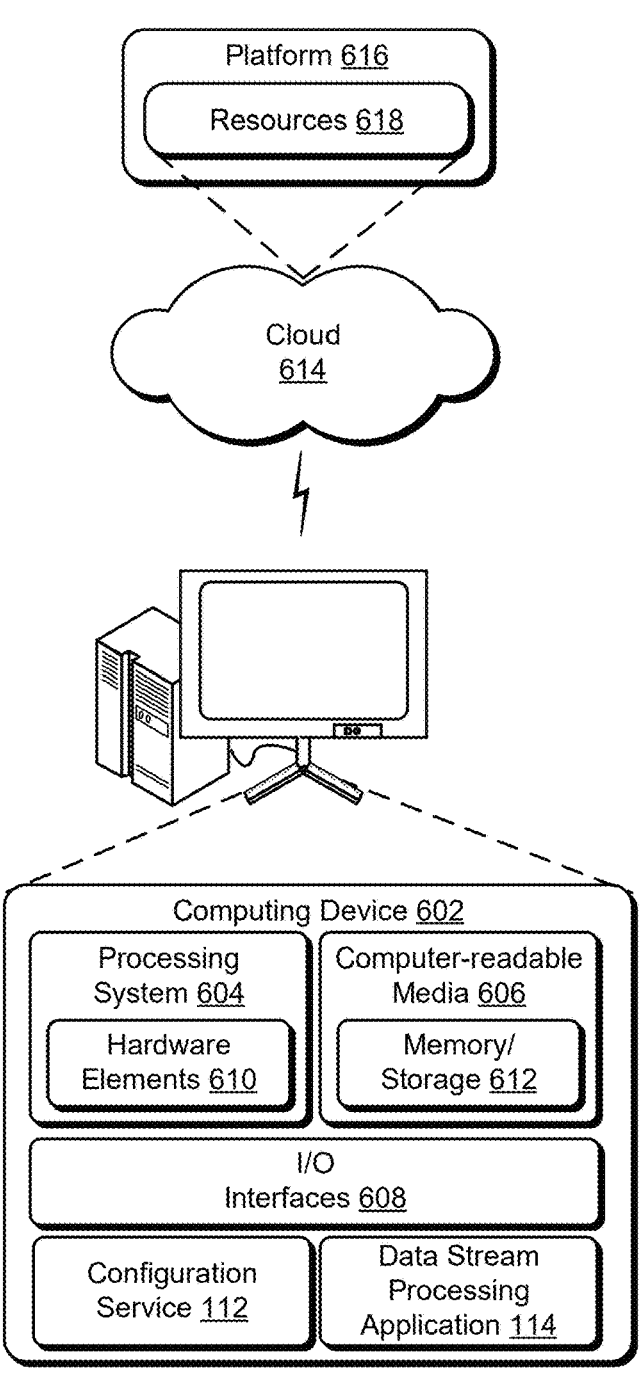
FIG. 6 illustrates an example system including various components of an example device that can be implemented as any type of computing device as described and/or utilized with reference to FIGS. 1-5 to implement embodiments of the techniques described herein.

FIG. 6 illustrates an example system 600 that includes an example computing device 602 that is representative of one or more computing systems and/or devices that implement the various techniques described herein. This is illustrated through inclusion of the configuration service 112 and the data stream processing application 114. The computing device 602 is configurable, for example, as a server of a service provider (e.g., the service provider system 102), a device associated with a client (e.g., a client device 104), an on-chip system, and/or any other suitable computing device or computing system.

The example computing device 602 as illustrated includes a processing device 604, one or more computer-readable media 606, and one or more input/output (I/O) interfaces 608 that are communicatively coupled, one to another. Although not shown, the computing device 602 further includes a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing device 604 is representative of functionality to perform one or more operations using hardware. Accordingly, the processing device 604 is illustrated as including hardware element 610 that is configurable as processors, functional blocks, and so forth. This includes implementation in hardware as an application specific integrated circuit or other logic device formed using one or more semiconductors. The hardware elements 610 are not limited by the materials from which they are formed or the processing mechanisms employed therein. For example, processors are configurable as semiconductor(s) and/or transistors (e.g., electronic integrated circuits (ICs)). In such a context, processor-executable instructions are electronically executable instructions.

The computer-readable storage media 606 is illustrated as including memory/storage 612 that stores instructions that are executable to cause the processing device 604 to perform operations. The memory/storage 612 represents memory/storage capacity associated with one or more computer-readable media. The memory/storage 612 includes volatile media (such as random access memory (RAM)) and/or nonvolatile media (such as read only memory (ROM), Flash memory, optical disks, magnetic disks, and so forth). The memory/storage 612 includes fixed media (e.g., RAM, ROM, a fixed hard drive, and so on) as well as removable media (e.g., Flash memory, a removable hard drive, an optical disc, and so forth). The computer-readable media 606 is configurable in a variety of other ways as further described below.

Input/output interface(s) 608 are representative of functionality to allow a user to enter commands and information to computing device 602, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., employing visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 602 is configurable in a variety of ways as further described below to support user interaction.

Various techniques are described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques are configurable on a variety of commercial computing platforms having a variety of processors.

An implementation of the described modules and techniques is stored on or transmitted across some form of computer-readable media. The computer-readable media includes a variety of media that is accessed by the computing device 602. By way of example, and not limitation, computer-readable media includes "computer-readable storage media" and "computer-readable signal media."

"Computer-readable storage media" refers to media and/or devices that enable persistent and/or non-transitory storage of information (e.g., instructions are stored thereon that are executable by a processing device) in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media include but are not limited to RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and are accessible by a computer.

"Computer-readable signal media" refers to a signal-bearing medium that is configured to transmit instructions to the hardware of the computing device 602, such as via a network. Signal media typically embodies computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 610 and computer-readable media 606 are representative of modules, programmable device logic and/or fixed device logic implemented in a hardware form that are employed in some embodiments to implement at least some aspects of the techniques described herein, such as to perform one or more instructions. Hardware includes components of an integrated circuit or on-chip system, an application-specific integrated circuit (ASIC), a field-programmable gate array (FPGA), a complex programmable logic device (CPLD), and other implementations in silicon or other hardware. In this context, hardware operates as a processing device that performs program tasks defined by instructions and/or logic embodied by the hardware as well as a hardware utilized to store instructions for execution, e.g., the computer-readable storage media described previously.

Combinations of the foregoing are also be employed to implement various techniques described herein. Accordingly, software, hardware, or executable modules are implemented as one or more instructions and/or logic embodied on some form of computer-readable storage media and/or by one or more hardware elements 610. The computing device 602 is configured to implement particular instructions and/or functions corresponding to the software and/or hardware modules. Accordingly, implementation of a module that is executable by the computing device 602 as software is achieved at least partially in hardware, e.g., through use of computer-readable storage media and/or hardware elements 610 of the processing device 604. The instructions and/or functions are executable/operable by one or more articles of manufacture (for example, one or more computing devices 602 and/or processing devices 604) to implement techniques, modules, and examples described herein.

The techniques described herein are supported by various configurations of the computing device 602 and are not limited to the specific examples of the techniques described herein. This functionality is also implementable all or in part through use of a distributed system, such as over a "cloud" 614 via a platform 616 as described below.

The cloud 614 includes and/or is representative of a platform 616 for resources 618. The platform 616 abstracts underlying functionality of hardware (e.g., servers) and software resources of the cloud 614. The resources 618 include applications and/or data that can be utilized while computer processing is executed on servers that are remote from the computing device 602. Resources 618 can also include services provided over the Internet and/or through a subscriber network, such as a cellular or Wi-Fi network.

The platform 616 abstracts resources and functions to connect the computing device 602 with other computing devices. The platform 616 also serves to abstract scaling of resources to provide a corresponding level of scale to encountered demand for the resources 618 that are implemented via the platform 616. Accordingly, in an interconnected device embodiment, implementation of functionality described herein is distributable throughout the system 600. For example, the functionality is implementable in part on the computing device 602 as well as via the platform 616 that abstracts the functionality of the cloud 614.

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method, comprising:

receiving a configuration update changing configuration parameters of a data stream processing application from a source configuration to a target configuration, and specifying incremental update parameters indicating a number of partitions of the data stream processing application that are to be incrementally updated and a time interval to wait between updating different partitions of the data stream processing application, the number of partitions being greater than one; and incrementally updating the data stream processing application by:

during a first time interval, applying the target configuration to a first partition of the data stream processing application to process events of a data stream in accordance with the target configuration by the first partition, and applying the source configuration to a second partition of the data stream processing application to process the events of the data stream in accordance with the source configuration by the second partition; and applying, after the first time interval, the target configuration to the second partition.

2. The method of claim 1, wherein applying the target configuration to the second partition includes processing, after the first time interval, the events of the data stream in accordance with the target configuration by the first partition and the second partition.

3. The method of claim 1, wherein incrementally updating the data stream processing application includes receiving the configuration update as part of a configuration stream, the configuration stream implemented as part of a dynamic library of the data stream processing application.

4. The method of claim 3, wherein incrementally updating the data stream processing application includes connecting, using the dynamic library, the data stream to the configuration stream.

5. The method of claim 1, wherein incrementally updating the data stream processing application includes sharing the configuration update with a layer of parallel operators of the data stream processing application, the parallel operators maintaining the configuration update as a state.

6. The method of claim 5, wherein processing the events of the data stream in accordance with the target configuration during the first time interval includes:

receiving, by a subgrouping of the parallel operators, the events of the data stream, the first partition including the subgrouping;

determining, by the parallel operators in the subgrouping, that the target configuration is to be applied based on the incremental update parameters; and processing, by the parallel operators in the subgrouping, the events of the data stream in accordance with the target configuration based on the determining.

7. The method of claim 5, wherein processing the events of the data stream in accordance with the source configuration during the first time interval includes:

receiving, by a subgrouping of the parallel operators, the events of the data stream, the second partition including the subgrouping;

determining, by the parallel operators in the subgrouping, that the source configuration is to be applied based on the incremental update parameters; and processing, by the parallel operators in the subgrouping, the events of the data stream in accordance with the source configuration based on the determining.

8. The method of claim 1, wherein the first partition includes a first number of parallel operators of the data stream processing application, the second partition includes a second number of parallel operators of the data stream processing application, and the incremental update parameters include the first number of parallel operators and the second number of parallel operators.

9. The method of claim 1, further comprising causing, during the first time interval, display of an element in a user interface of a client device that is selectable to prevent the target configuration from being applied to the second partition and to re-apply the source configuration to the first partition.

10. The method of claim 1, further comprising causing, during the first time interval, display of a progress update in a user interface of a client device indicating that the target configuration has been applied to the first partition but has not yet been applied to the second partition.

11. A computing device, comprising:

a processing device; and a computer-readable storage medium storing instructions, that responsive to execution by the processing device, causes the processing device to perform operations including:

receiving, via user input to a user interface, a configuration update changing configuration parameters of a data stream processing application from a source configuration to a target configuration, the configuration update specifying incremental update parameters indicating a number of partitions of the data stream processing application that are to be incrementally updated and a time interval to wait between updating different partitions of the data stream processing application, the number of partitions being greater than one;

communicating the configuration update to a service provider system instructing the service provider system to incrementally apply the configuration update to a first partition of the data stream processing application, then apply the configuration update to a second partition of the data stream processing application after the time interval; and displaying, via the user interface and while the target configuration and the source configuration are each applied to at least one partition of the data stream processing application, a user interface element that is selectable to cancel the configuration update and re-apply the source configuration to one or more of the different partitions.

12. The computing device of claim 11, further comprising displaying, via the user interface and while the target configuration and the source configuration are each applied to the at least one partition of the data stream processing application, a progress update indicating the at least one partition to which the target configuration has been applied, and the at least one partition to which the source configuration is still applied.

13. The computing device of claim 11, wherein receiving the configuration update includes receiving, via the user interface, user input selecting a configuration version that has previously been implemented by the data stream processing application and updating the configuration parameters of the configuration version, the updated configuration version corresponding to the target configuration.

14. One or more non-transitory computer-readable storage media storing instructions that, responsive to execution by a processing device, cause the processing device to perform operations including:

receiving a configuration update changing parameters of a data stream processing application from a source configuration to a target configuration and specifying incremental update parameters indicating a number of partitions of the data stream processing application that are to be incrementally updated and a time interval to wait between updating different partitions of the data stream processing application, the number of partitions being greater than one; and incrementally updating the data stream processing application by:

during a first time interval, applying the target configuration to a first partition of the data stream processing application to process events of a data stream in accordance with the target configuration by the first partition, and applying the source configuration to a second partition of the data stream processing application to process the events of the data stream in accordance with the source configuration by the second partition; and applying, after the first time interval, the target configuration to the second partition.

15. The one or more non-transitory computer-readable storage media of claim 14, wherein incrementally updating the data stream processing application includes receiving the configuration update as part of a configuration stream, the configuration stream implemented as part of a dynamic library of the data stream processing application.

16. The one or more non-transitory computer-readable storage media of claim 14, wherein incrementally updating the data stream processing application includes sharing the configuration update with the first partition and the second partition of the data stream processing application, the first partition and the second partition maintaining the configuration update as a state.

17. The one or more non-transitory computer-readable storage media of claim 16, wherein applying the target configuration and the source configuration to the first partition and the second partition, respectively, includes determining, by the first partition and the second partition, whether to apply the target configuration or the source configuration by comparing the time interval to a time of receipt of the configuration update.

18. The one or more non-transitory computer-readable storage media of claim 14, wherein applying the target configuration to the second partition includes processing, after the first time interval, the events of the data stream in accordance with the target configuration by the first partition and the second partition.

19. The one or more non-transitory computer-readable storage media of claim 14, wherein applying the target configuration to the first partition includes processing, by a first subset of parallel operators of the first partition, the events of the data stream in accordance with the target configuration.

20. The one or more non-transitory computer-readable storage media of claim 14, wherein applying the source configuration to the second partition includes processing, by a second subset of parallel operators of the second partition, the events of the data stream in accordance with the source configuration.

* * * * *